(12) United States Patent
Tippetts

(10) Patent No.: US 7,021,240 B1
(45) Date of Patent: Apr. 4, 2006

(54) SQUIRREL FEEDERS

(76) Inventor: Mark W. Tippetts, 1075 County Rd. 782, Mountain Home, AR (US) 72653

( * ) Notice: Subject to any disclaimer, the term of this patent is extended or adjusted under 35 U.S.C. 154(b) by 7 days.

(21) Appl. No.: 10/968,442

(22) Filed: Oct. 20, 2004

(51) Int. Cl.
*A01K 39/00* (2006.01)
*A01K 5/00* (2006.01)

(52) U.S. Cl. ..................................... 119/52.1; 119/57.8
(58) Field of Classification Search ............ 119/51.01, 119/52.1, 57.8; D30/131
See application file for complete search history.

(56) References Cited

U.S. PATENT DOCUMENTS

| | | | |
|---|---|---|---|
| 2,826,171 A | | 3/1958 | Piel |
| 3,537,178 A | | 11/1970 | Regan |
| 4,246,869 A | * | 1/1981 | Tobin, Jr. .................. 119/57.8 |
| D337,861 S | | 7/1993 | Ross |
| 5,755,178 A | | 5/1998 | Lush |
| 5,970,913 A | * | 10/1999 | Bloedorn .................... 119/57.8 |
| 6,199,509 B1 | * | 3/2001 | Mostyn et al. ........... 119/51.01 |
| 6,363,887 B1 | * | 4/2002 | Davis ........................ 119/52.1 |
| 6,405,673 B1 | * | 6/2002 | Allender .................... 119/52.1 |
| 6,564,746 B1 | | 5/2003 | Burnham |
| D505,522 S | * | 5/2005 | Jurk .......................... D30/131 |
| 2004/0216683 A1 | * | 11/2004 | Peltier ....................... 119/57.8 |

FOREIGN PATENT DOCUMENTS

GB           2266830      *  5/1992

* cited by examiner

*Primary Examiner*—Teri Pham Luu
*Assistant Examiner*—Elizabeth Shaw
(74) *Attorney, Agent, or Firm*—Stephen D. Carver

(57) ABSTRACT

An animal feeder primarily for squirrels comprises an elongated, tubular hopper that sequentially discharges husked ears of corn, and a lower, aligned cob discharge orifice that drops depleted corn cobs from the feeder. The vertically oriented hopper is sized to slidably contain one or more husked ears of corn which drop through it in response to gravity. A feeding tray suspended beneath the hopper initially contacts ears of corn when they drop from the hopper. An animal access region is formed between the hopper and the tray. Portions of ears temporarily occupying this region are exposed to squirrels for eating. A cob discharge orifice formed in the tray beneath the hopper bottom is sized to automatically discharge empty corn cobs from the feeder after the ears are reduced in diameter by corn depletion.

16 Claims, 14 Drawing Sheets

SQUIRREL FEEDERS

BACKGROUND OF THE INVENTION

I. Field of the Invention

The present invention relates generally to animal feeders. More particularly, the present invention relates to hanging feeders particularly adapted for squirrel. Known prior art pertaining to the invention is classified in United States Patent Class 119, Subclass 51.01, 51.03, 53, 55 and 57.

II. Description of the Prior Art

A variety of feeders for wild animals are known in the art. Many hours of pleasure may be derived by feeding wildlife. Typical feeders include some form of hopper for storing feed, that is suspended from a tree or other supporting object, hopefully within view of the owner. Usually a perch or support platform is disposed adjacent the hopper for allowing an animal convenient access while feeding. After a well-stocked feeder has been installed for a short period of time, numerous target animals will periodically visit it for feeding. The presence of various wild birds, for example, within one's yard is highly desirable. However, other forms of enjoyable wildlife, such as deer and squirrels, can also be attracted by well-stocked feeders. Hours of pleasure can be derived from watching various animals that are drawn to well-placed feeders as they maneuver about the feeder and eat.

Many conventional feeders, such as wild bird feeders, are designed to store and dispense granular feed. A variety of wild bird feed, comprising a mixture of corn, various seeds and grains, is readily available for stocking such feeders. Of course it is well recognized that corn is highly prized by many wild animals, including deer, squirrels, chipmunks and the like. Although granular products are probably the most popular feed for simple wild-animal feeders, unshelled corn cobs are quite popular as well. Typically, during feeding, granular corm may be scattered about the feeder, and dropped to the ground haphazardly by various hungry animals. With granular feeders some of the corn will inevitably drop to a position on the ground that can not be easily seen by an observer. This defeats one of the major purposes of maintaining a wild animal feeder.

On the other hand, corn cobs are harder and slower to consume. Ears of corn cannot be easily broken or thrown and scattered about, so less food is wasted and dropped. If a feeder is designed to hold a corn cob, for example, in one place during feeding, the observer will have an easier time seeing and enjoying the animals.

However, feeders designed for corn cobs must be maintenanced often as corn is depleted. To minimize the frequency at which cobs must be replenished, some prior art feeders hold several corn cobs that are all freely accessible to the animal. While this results in a longer viewing period between restocking efforts, corn that is exposed to the weather in this fashion can rot or deteriorate from the combined effects of rain and time. On the other hand, if corn cobs are stored in a hopper, there is a difficulty in periodically conveying or ejecting them for access by feeding animals. It would be highly desirable to provide a corn cob feeder that ejects spent cobs periodically and reliably presents fresh corn cobs to the animals.

U.S. Pat. No. 6,564,746 issued to Burnham on May 20, 2003 shows a squirrel-powered feeder structure that utilizes energy produced by live squirrels to dispense feed from a storage hopper. The feeder is suspended above the ground from a tree branch or other structure. Feed, such as corn, stored within the hopper, drops to the ground to feed various wild animals including squirrels and deer. The feeder assembly comprises tubular feed container with a horizontal platform mounted on the bottom, a port hole for allowing feed particles to spill out onto the platform, and an agitating device that sweeps feed particles off the platform to the ground below. The agitating device is activated by the force generated by the weight and momentum of squirrels leaping back and forth from the tree trunk to the platform.

U.S. Design Pat. No. D337,861 issued to Ross Jul. 27, 1993 shows a squirrel feeder that holds several ears of corn. There is no hopper for sheltering the corn, and no means for serially feeding spent cobs as corn is eaten.

U.S. Pat. No. 5,755,178 issued to Lush on May 26, 1998 shows a wild game feeder that is suitable for squirrels. An upwardly extending member supports a block of animal feed.

No prior art animal feeder known to me is ideally adapted for slowly feeding squirrels with husked ears of corn. No such prior at feeder automatically ejects spent corn cobs, and self loads another ear of corn into position for controlled feeding.

SUMMARY OF THE INVENTION

This invention provides various designs for a squirrel feeder adapted to serially feed ears of corn for consumption by animals, primarily squirrels.

Several ears of corn are stored in a vertically upright, tubular hopper. The hopper is substantially perpendicular to a lower feeding tray that provides a rest for the animals. Ears of corn are gravity fed out of the hopper, so that lower portions of the ears are exposed for eating. An animal-access region is defined between the lower lip of the hopper and the feeding tray. Portions of the corn ears traversing this region are freely accessible by the squirrel. As corn is depleted from exposed ears by hungry animals, only a raw corn cob is left. The reduced diameter of the corn cob, stripped of all the corn it formerly held, allows it to drop down from the hopper through a cob discharge orifice formed in the feeder tray whose diameter is smaller that the diameter of the hopper.

Thus a basic object is to provide a feeder for squirrels, chipmunks and the like.

Another fundamental object of my invention is to provide a reliable feeder for wild animals that serially feeds husked ears of corn, and then automatically ejects spent corn cobs.

A related object is to provide a feeder that exposes only minimal portions of a husked ear of corn for feeding, so that a squirrel or other animal dining at the feeder is limited in how much corn can be readily consumed. It is an important feature of my squirrel feeders that the husked ears of corn cannot be removed by squirrels to be eaten or stored elsewhere.

Another object of my invention is to provide a corn cob feeder that does not use mechanical devices such as motors, timers, batteries, or electronic components. It is a feature of my invention that the devices operates simply by gravity.

Another object is to minimize the time that must be spent reloading an animal feeder with corn cobs.

Another object of the present invention to provide a feeder that is easily deployed upon a branch or other convenient support.

Another object is to provide a feeder ideally adapted for squirrels.

Another object is to eject spent corn cobs from an animal corn feeder automatically by gravity in response to the depletion of corn.

Yet another object is to provide a feeder of the character described that protectively stores and exposes corn cobs for animal feeding, and then ejects depleted cobs.

Yet another object is to provide a squirrel feeder that serially ejects corn cobs, one at a time.

Another basic object is to provide a simple and reliable manner for releasing depleted corn cobs from an animal feeder.

A related object is to provide a simple feeder device that protectively stores a plurality of corn cobs, dispenses them serially to squirrels, and then sequentially ejects them as cobs are depleted.

These and other objects and advantages of the present invention, along with features of novelty appurtenant thereto, will appear or become apparent in the course of the following descriptive sections.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION

Figure 1:
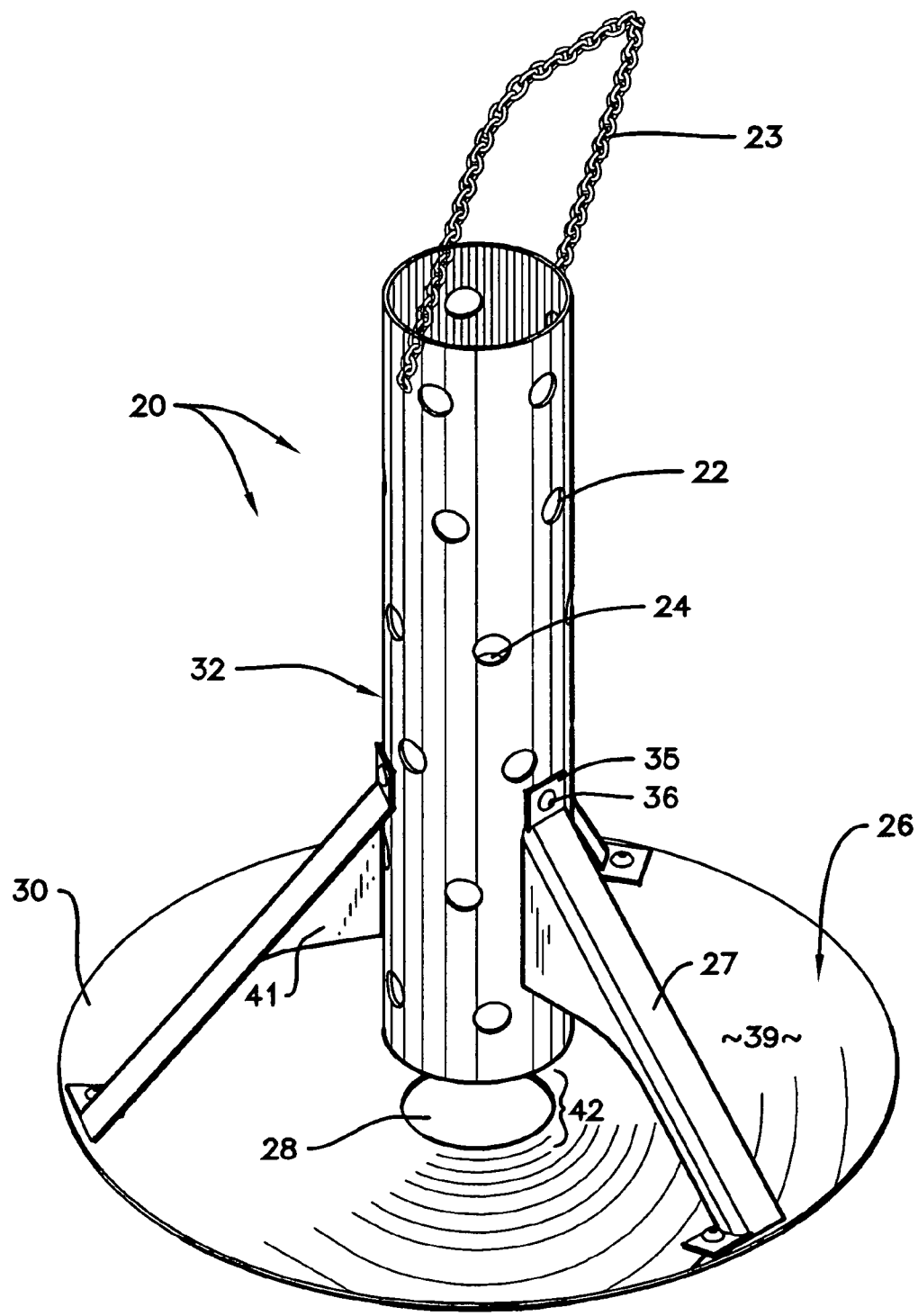
FIG. 1 is a frontal isometric view showing a preferred squirrel feeder.
Figure 2:
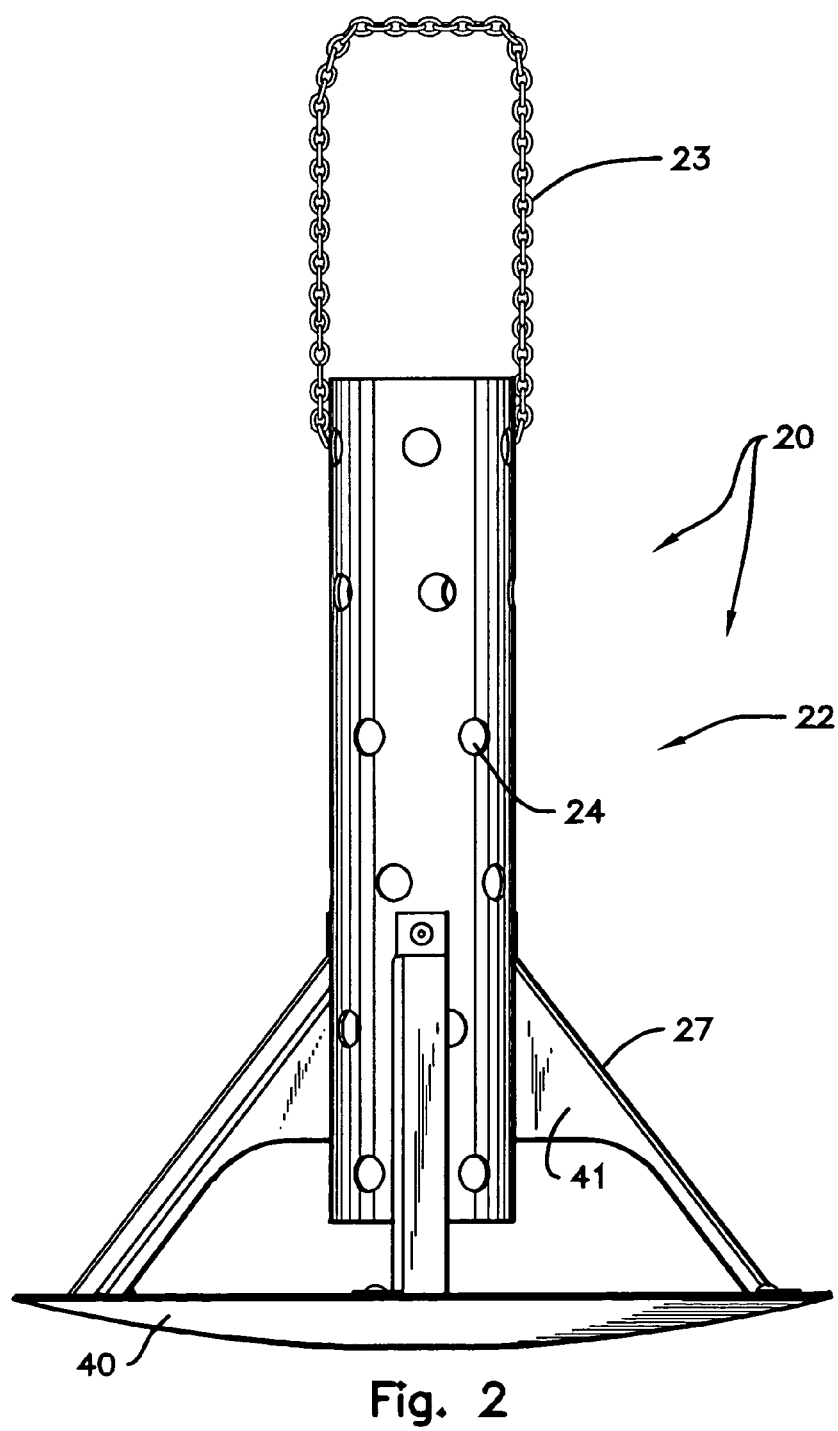
FIG. 2 is a front elevational view of the preferred feeder.
Figure 3:
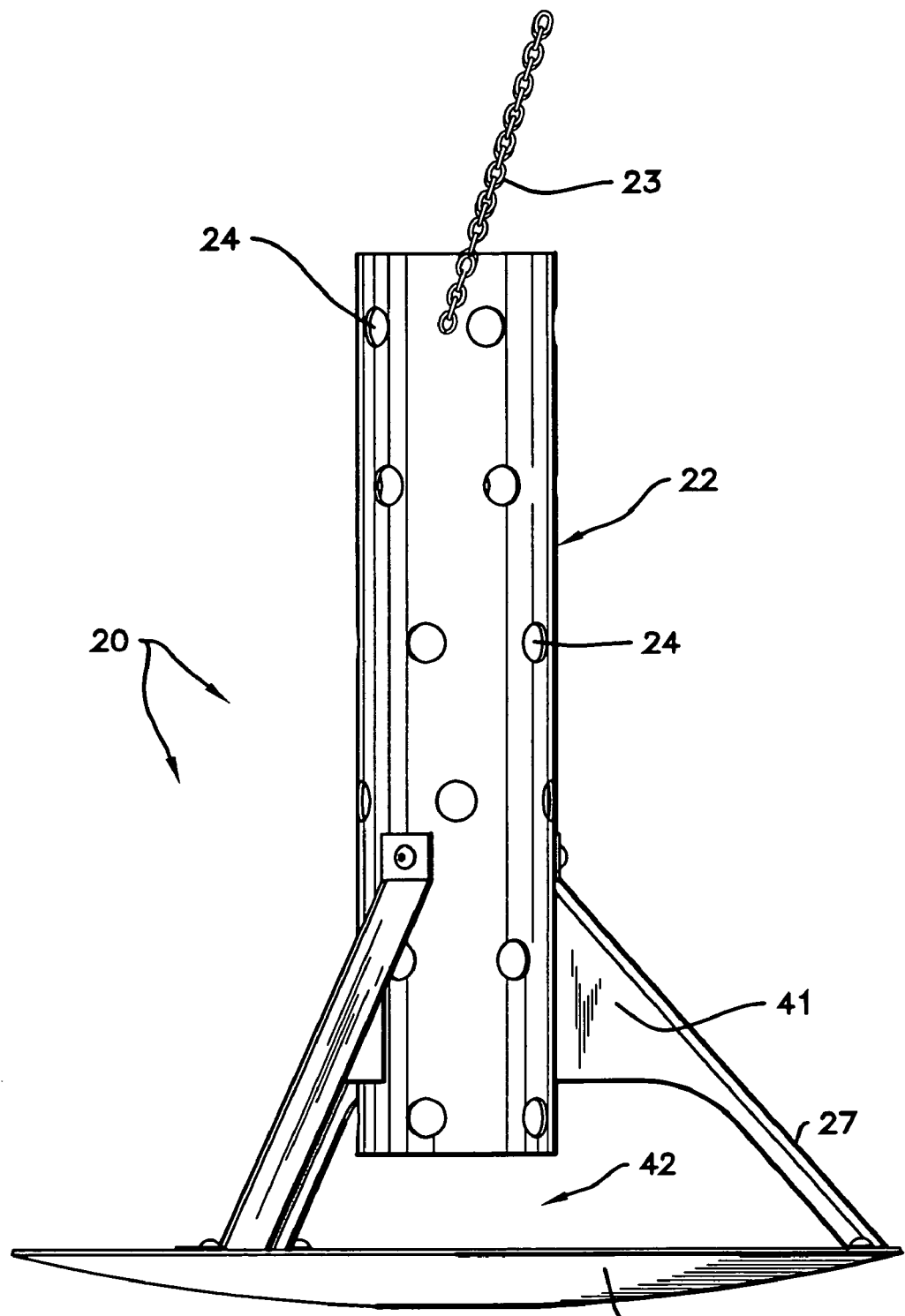
FIG. 3 is a left side elevational view of the preferred feeder.
Figure 4:
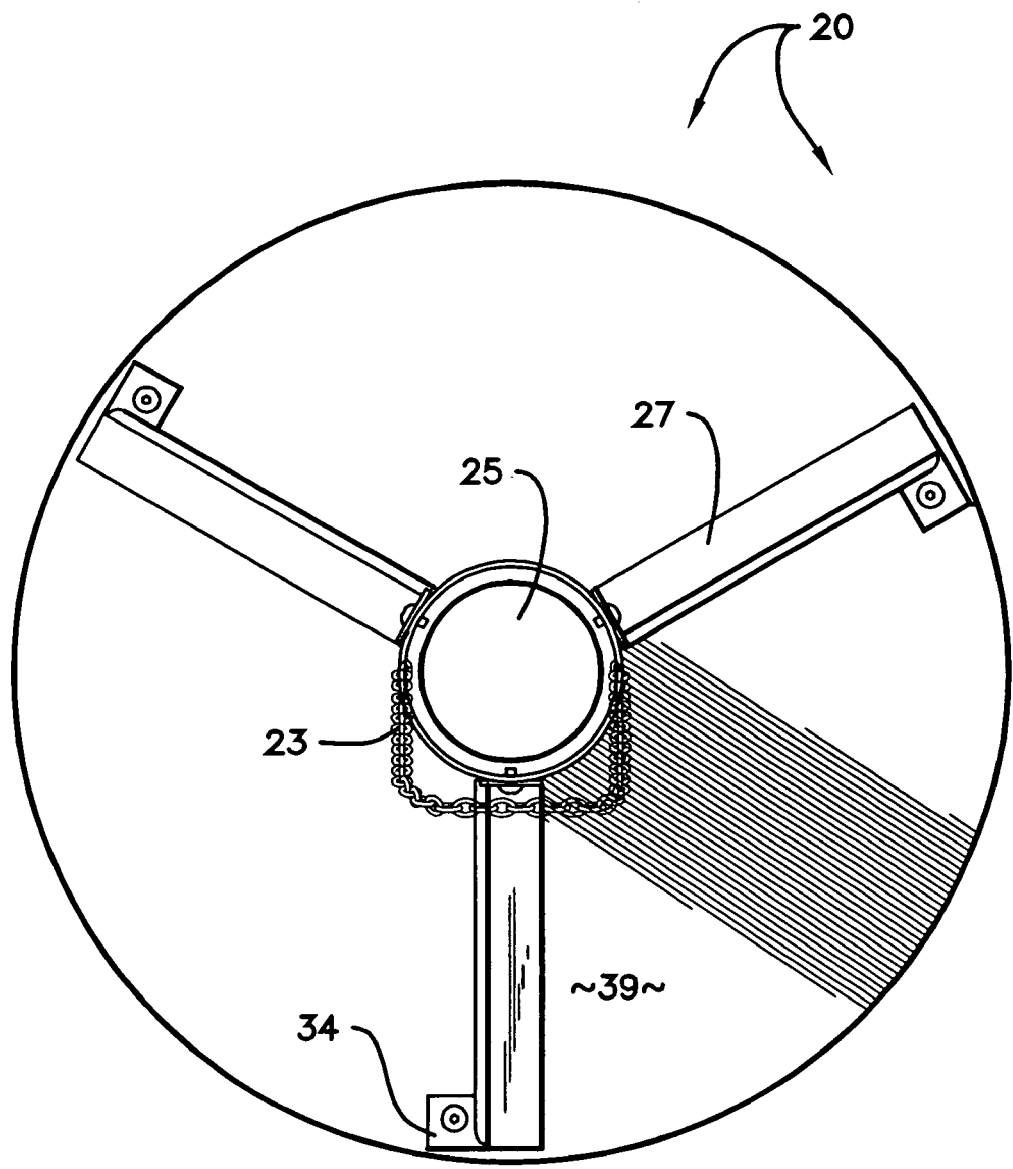
FIG. 4 is a top plan view of the preferred feeder.

With initial reference now directed to FIGS. 1–9 of the appended drawings, a squirrel feeder constructed in accordance with the best mode of the invention has been generally designated by the reference numeral 20. FIGS. 10–18 show an alternative embodiment of a squirrel feeder to be discussed later that shares most of the prominent features of feeder 20. Importantly, both embodiments store at least one, and hopefully plurality of husked ears of corn for slowly and deliberately feeding squirrels. Both embodiments eject spent corn cobs automatically, and allow a fresh ear of corn to drop into position for subsequent feeding.

The preferred feeder 20 comprises a vertically upright hopper, generally designated by the reference numeral 22. Preferably the hopper is elongated and tubular, with a round cross section like an ear of corn. The internal diameter of the hopper is substantially equal to that of a husked ear of corn, and one or more ears of corn that are temporarily stored within the hopper are able to slidably drop downwardly therewithin as corn is depleted as animals eat. Preferably a mounting chain 23 is secured at the hopper top for suspending the feeder 20 from a convenient overhead support. A plurality of optional ventilation holes 24 are defined in the body of the hopper, at regularly spaced apart locations.

Hopper 22 supports a coaxially centered, dish-like feeding tray 26, that is suspended from the hopper 22 by a plurality of radially spaced-apart, sheet-metal legs 27. A coaxially centered cob discharge orifice 28 is disposed at the center of the sheet-metal tray 26, aligned with the tubular interior passageway 25 (FIG. 4) through the center of the hopper 22. Preferably tray 26 has a convex bottom 40 (FIG. 5) that projects downwardly. Thus the upper supporting surface 39 (FIG. 2) of the tray 26 is concave, to temporarily support, for example, dislodged corn kernels. Legs 27 extend at an acute angle generally from the outside periphery 30 of the tray 26 to the hopper midportion 32. Each leg terminates at its opposite ends in suitable tabs 34, 35 (FIGS. 1, 4) that are respectively affixed to the tray 26 and the hopper 22 by rivets 36. Appropriate structural reinforcement is provided by suitable webs 41 joining the underside of the legs 27 with the hopper 22.

Figure 5:
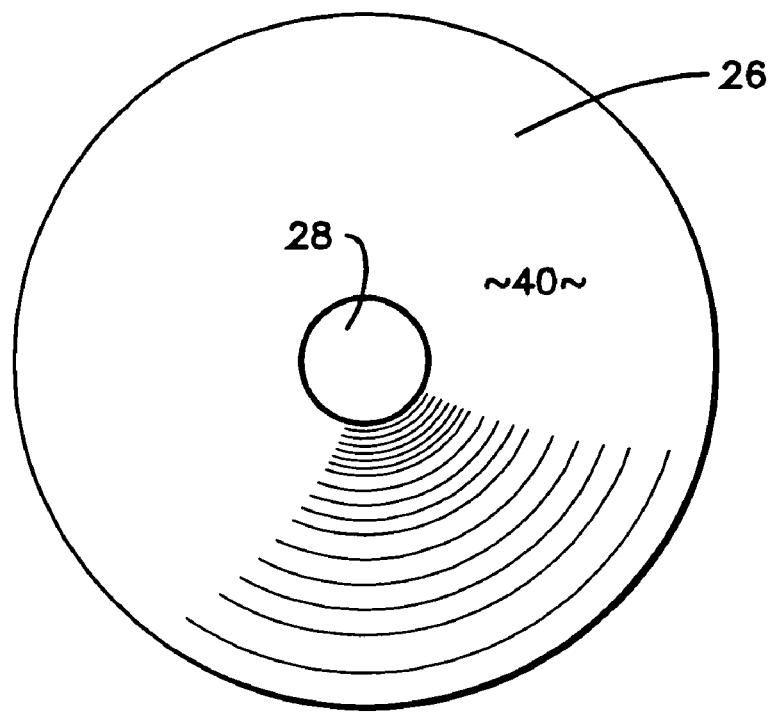
FIG. 5 is a bottom isometric view of the preferred feeder.
Figure 6:
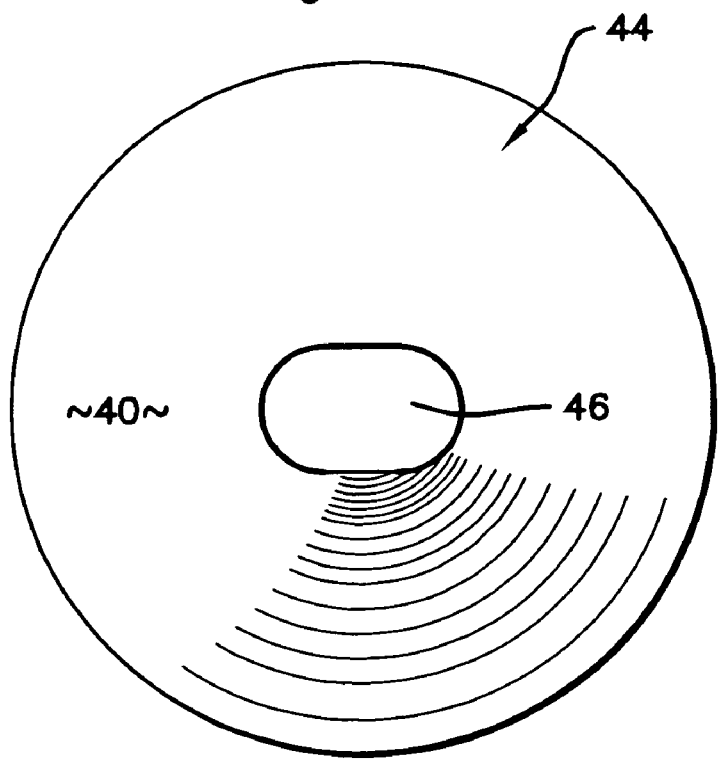
FIG. 6 is a bottom isometric view of the preferred feeder, showing a modified elliptical cob discharge hole.
Figure 7:
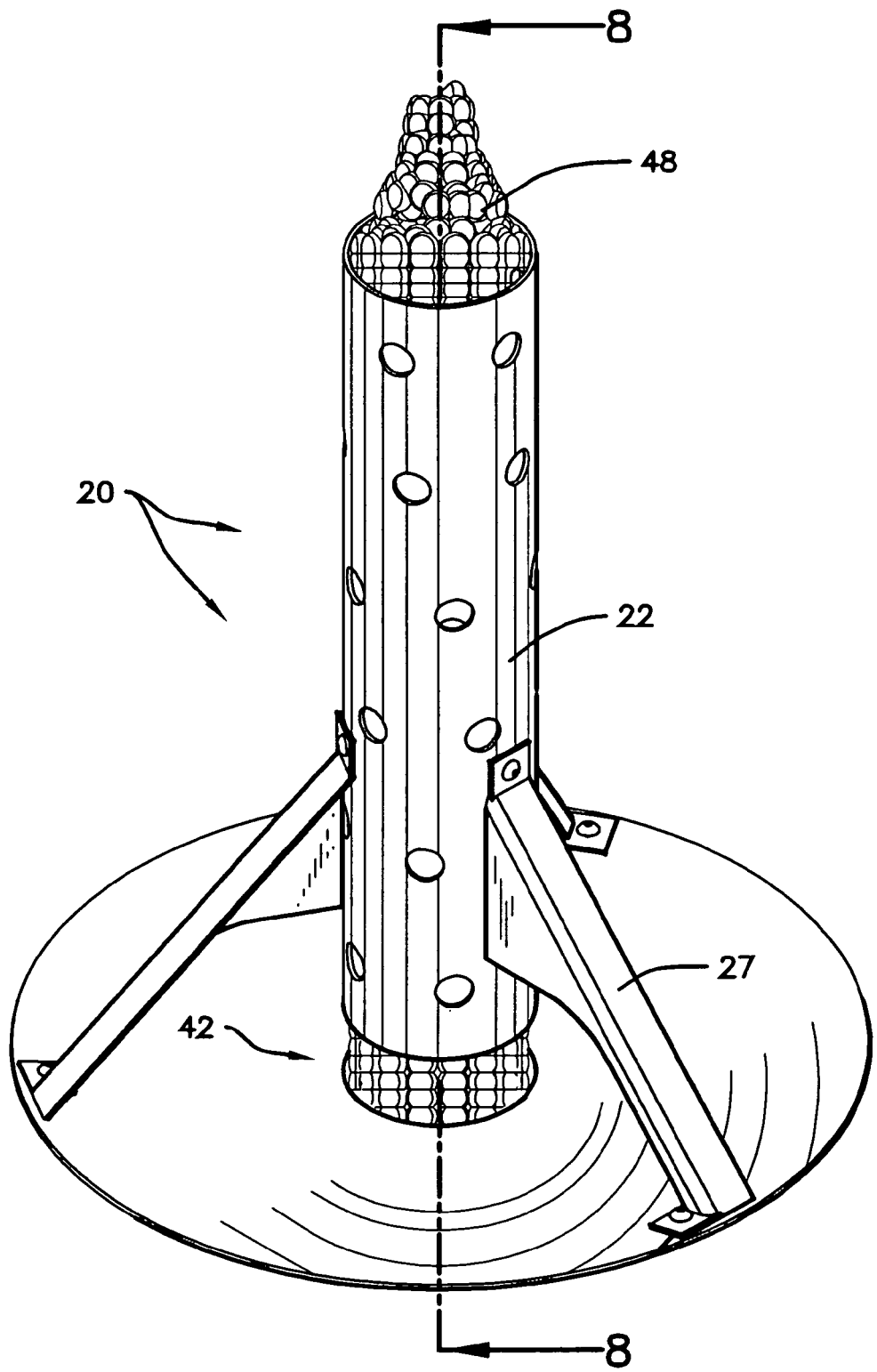
FIG. 7 is an isometric view of the preferred feeder loaded with corn cobs.

Tray 26 is preferably circular. In three dimensions is shaped like a dish, having convex bottom 40, with an opposite inner concave surface 39 (FIG. 1). As seen in FIG. 5, the cob discharge orifice 28 is preferably round and centered, being aligned concentrically with the hopper 22 and being located at the center of tray 26. Preferably, the diameter of discharge orifice 28 is somewhat greater than the diameter of a spent corn cob, so that cobs will easily pass through it without interference. However, to prevent a full ear of corn from dropping through, the diameter of the orifice must be smaller that the undepleted ear. Importantly, there is a somewhat cylindrically shaped animal access region 42 formed at the bottom of the hopper, immediately above the tray 26 (FIG. 1). When an ear of corn (i.e., FIGS. 8, 9) drops through the hopper interior passageway 25, a bottom portion of the ear will clear the hopper, and be exposed for eating within access region 42. The bottom of an ear protruding beneath the hopper will contact the periphery of orifice 28, and the ear cannot drop through orifice 28 until it "shrinks" as corn kernels are depleted. Once kernels of corn exposed for squirrel access within squirrel access region 42 are eaten, and the ear is reduced in diameter as corn is depleted, a bare cob results. The reduced diameter of bare cobs causes them to gravity-feed out of the feeder through orifice 28, and drop to the ground.

Where ears of corn of varying diameter and shapes are employed, I have found it possibly advantageous to configure the discharge orifice differently. As best seen in FIG. 6, an alternative tray 44 is provided with an alternative cob discharge orifice 46, which is somewhat elliptical or oval-shaped. In the example, one foci of the ellipse shares the center of the former orifice 28, but the main extent of the discharge orifice 46 is extended to the left (i.e., as viewed in FIG. 6).

Figure 8:
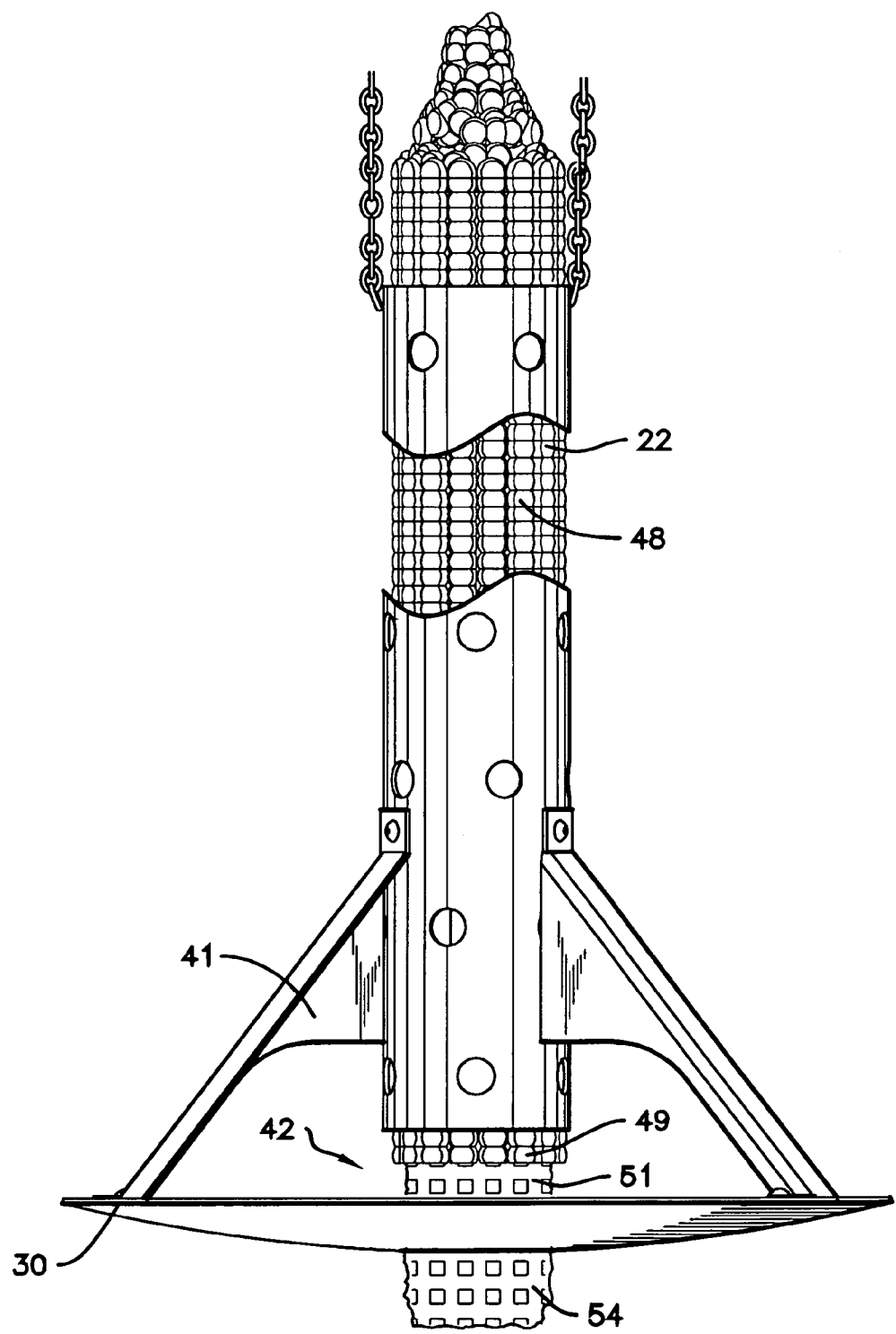
FIG. 8 is an enlarged, fragmentary sectional view of the feeder taken generally along line 8—8 of FIG. 7 in the direction of the arrows.
Figure 9:
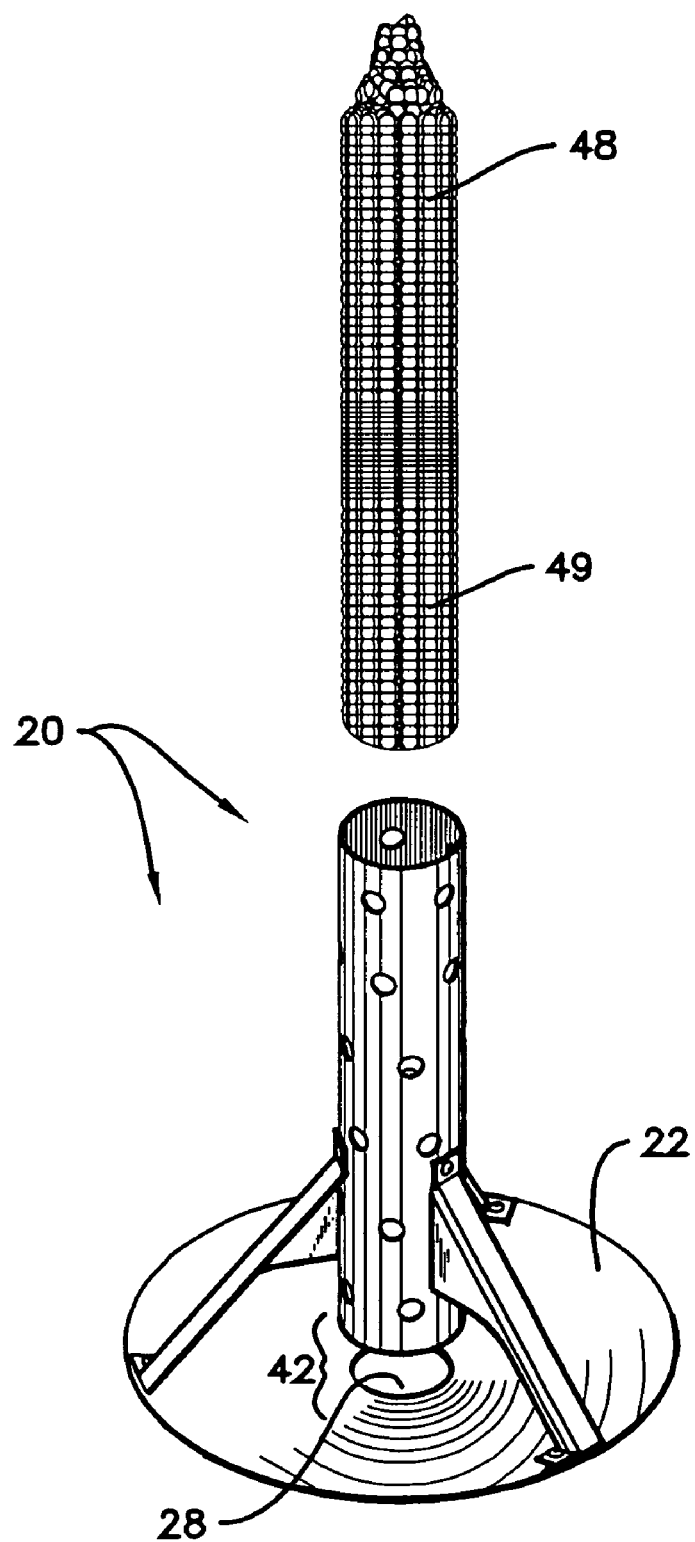
FIG. 9 is an exploded isometric view of the preferred feeder showing how corn cobs enter and discharge from the feeder.

Referring primarily to FIGS. 8 and 9, upper and lower husked ears of corn are respectively designated by the reference numerals 48, 49. Lower ear 49 will drop towards the hopper bottom. The intermediate portion 51 of the lower ear 49 is exposed for eating within access region 42, beneath the hopper 22 and above the tray 26. However, the stripped or bare corn cob portion 54, which has been reduced in diameter by the consumption of corn kernels by animals, is free to drop through the discharge orifice 28 discussed earlier. In this manner cobs that are partially consumed will fall slowly through the discharge orifice, and once the corn is all gone, the depleted cob will drop clear, allowing the next ear of corn 48 (FIG. 9) to automatically drop into place for eating.

Figure 10:
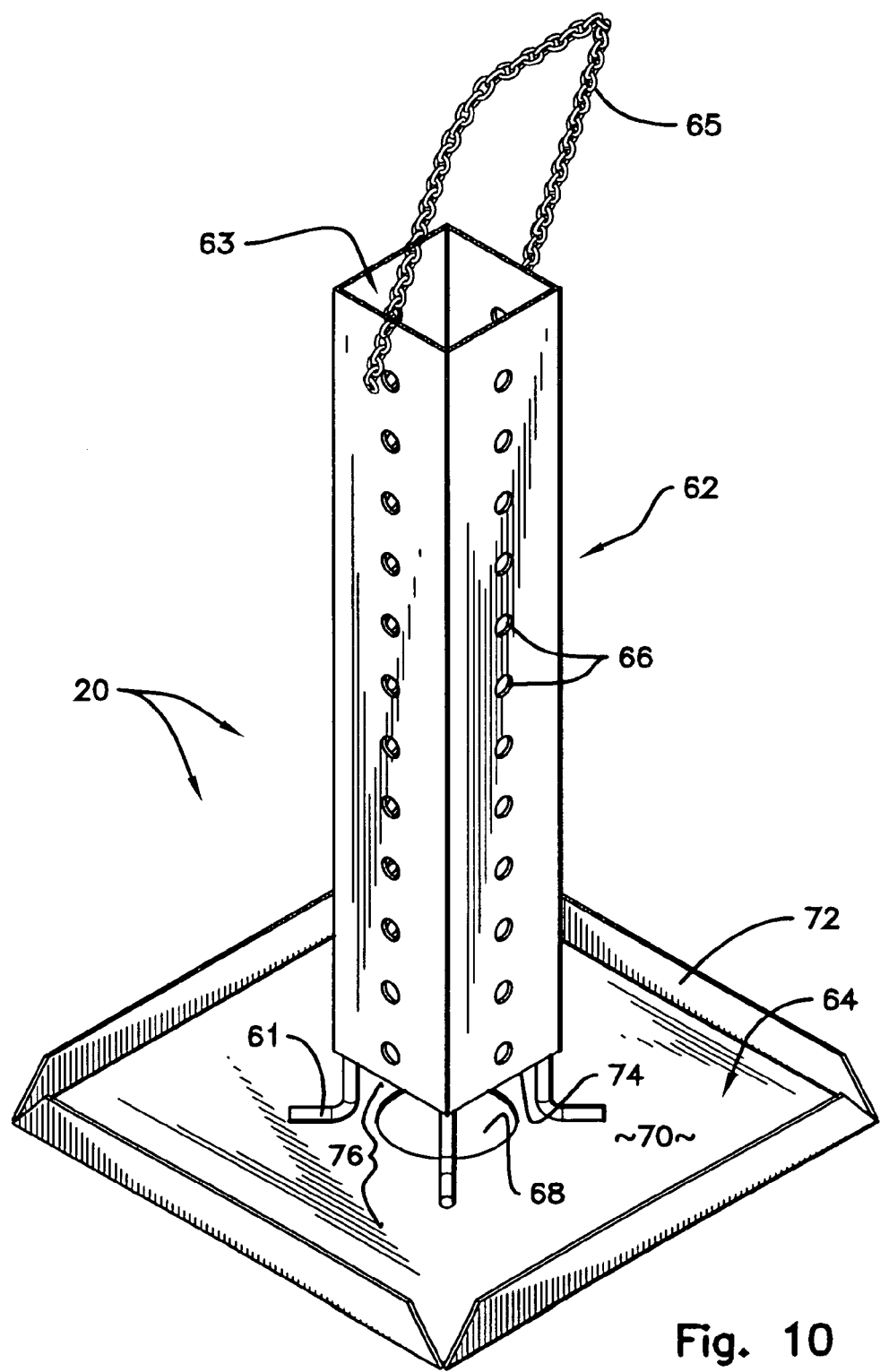
FIG. 10 is a frontal isometric view of an alternative squirrel feeder.
Figure 11:
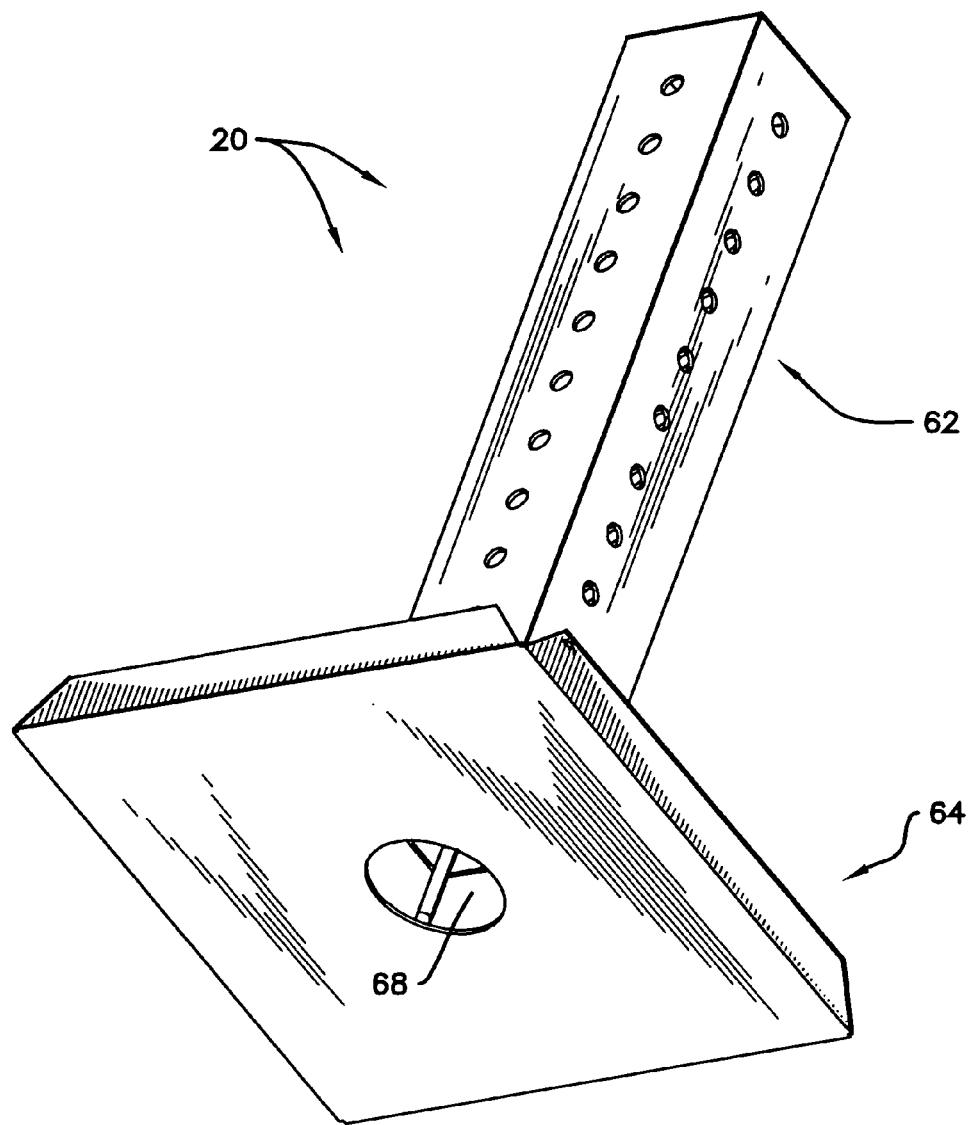
FIG. 11 is a bottom isometric view of the alternative feeder.

An alternative "square" feeder embodiment is seen in FIGS. 10–18. Feeder 60 comprises a vertically upright, elongated hopper 62 whose square interior passageway 63 is dimensioned to receive husked ears of corn. Hopper 62 is tubular, with a square cross section, and it is secured to a lower, generally square feed tray 64 (i.e., FIGS. 10, 14) with radially spaced-apart legs 61. The dimensions of the hopper must be adequate to allow husked ears of corn to freely slide therewithin. An optional mounting chain 65 is secured at the hopper top for suspending the feeder 60 from a convenient overhanging structure, such as a branch or the like. A plurality of optional ventilation holes 66 are defined in the body of the hopper 62, at regularly spaced apart locations. As before, a corn cob discharge orifice 68 disposed at the center of the tray 64 aligns with tubular interior passageway 63 through the center of hopper 62. Preferably, tray 64 has a square central floor 70 bounded on its periphery by upturned peripheral walls 72. Between the bottom 74 of hopper 62 and the floor 70 of tray 64 there is a squirrel access region 76 (FIG. 10). When the bottom of an ear of corn dropping through hopper passageway 63 enters region 76, it is exposed for eating. As before, the bottom of said ear will contact the periphery of orifice 68, so the ear cannot drop through orifice 68.

Figure 12:
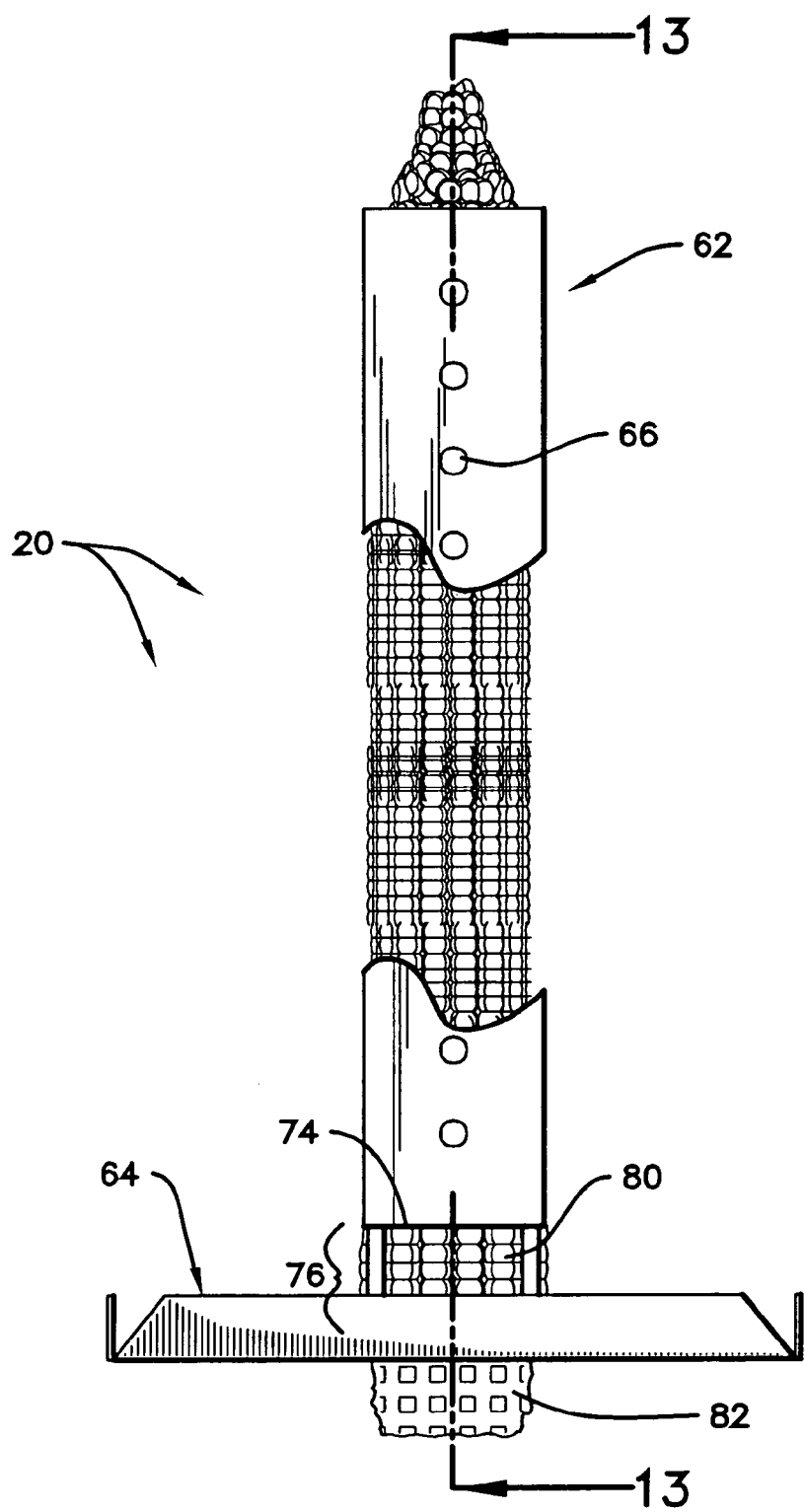
FIG. 12 is a fragmentary elevational view of the alternative feeder.
Figure 13:
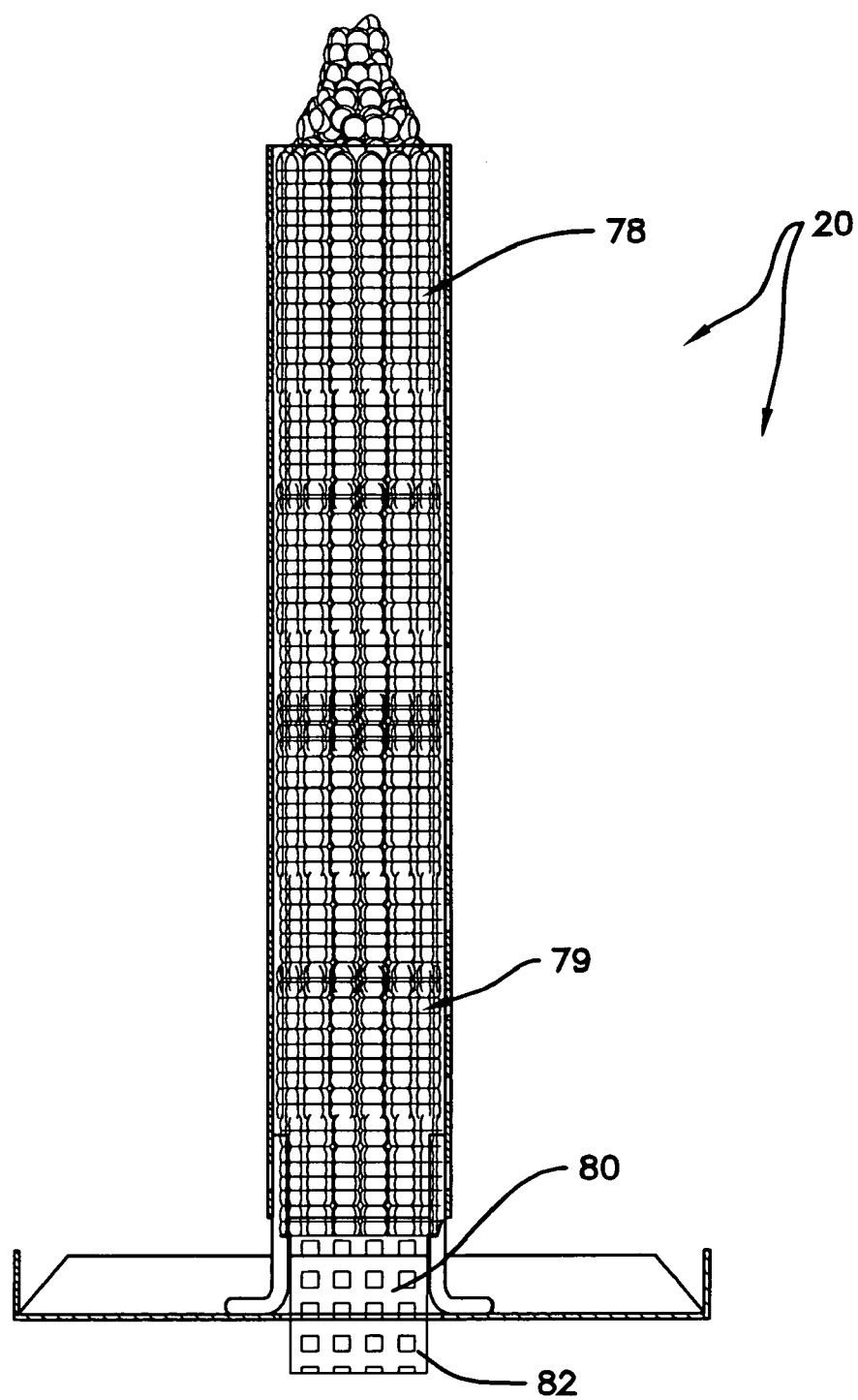
FIG. 13 is fragmentary longitudinal sectional view of the alternative feeder, taken generally along line 13—13 of FIG. 12.
Figure 14:
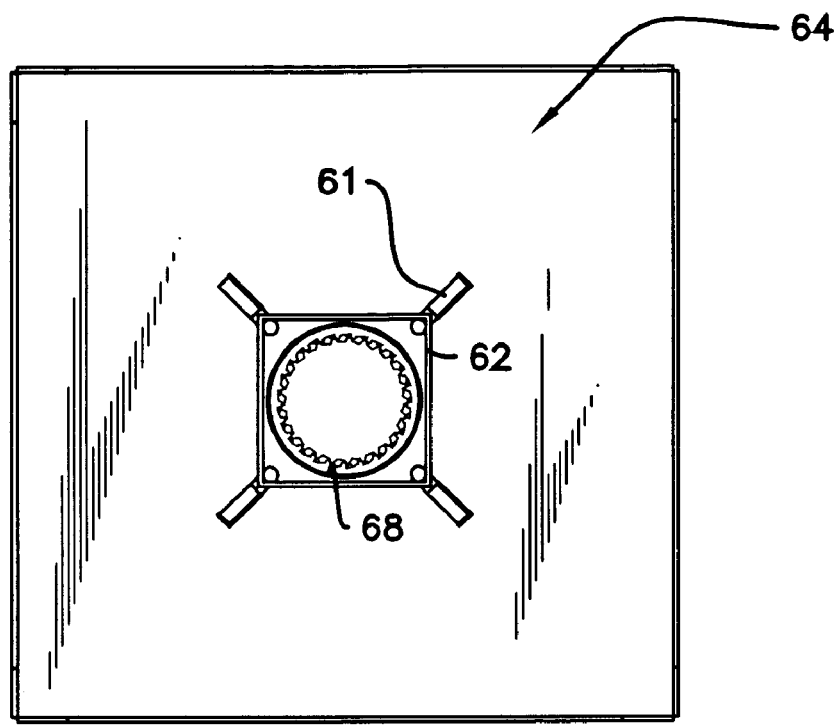
FIG. 14 is a top plan view of the alternative feeder.

Once corn is eaten away from the ear within squirrel access region 76, and the ear diameter drops, the stripped cob can escape orifice 68. The bare cob clears the feeder, and ultimately drops to the ground. Referencing FIG. 13, there is an upper and lower ear of corn within the feeder, respectively designated by the reference numerals 78, 79. That portion of the ear 79 exposed for eating within squirrel access region 76 has been designated by the numeral 80. The bare corn cob portion that exits the feeder after the squirrels have stripped it has been designated by the reference numeral 82 (FIGS. 12, 13).

Figure 15:
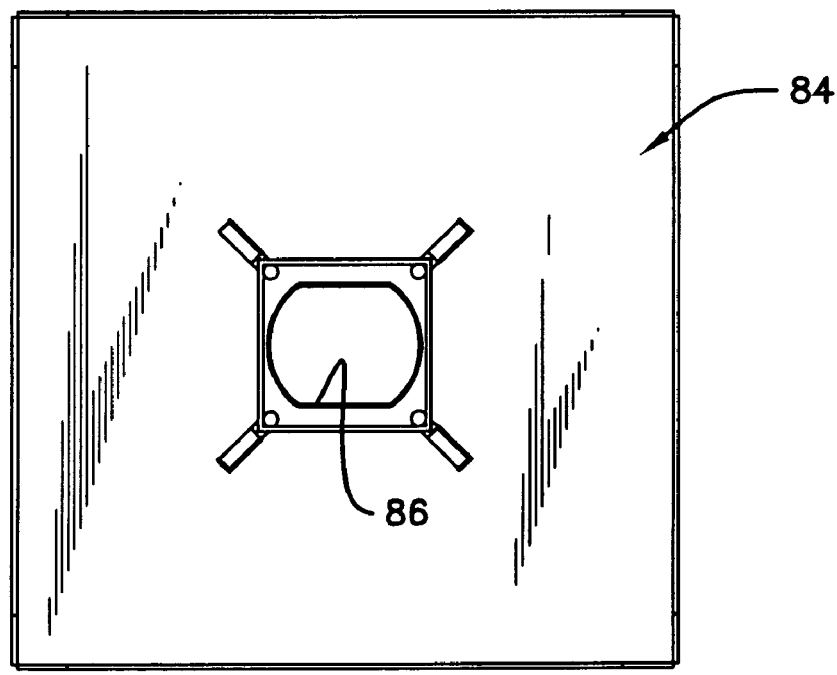
FIG. 15 is a top plan view of the alternative feeder with a modified elliptical cob discharge hole.
Figure 16:
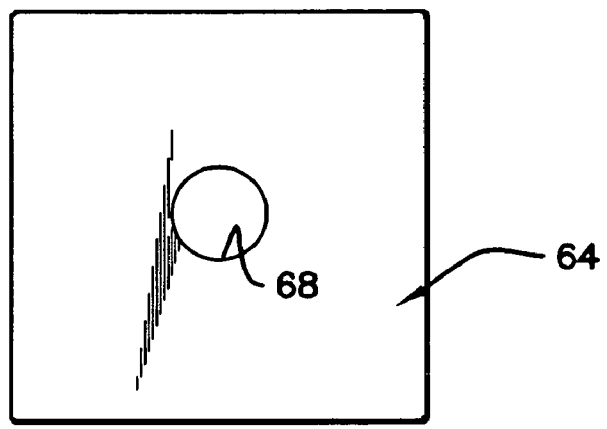
FIG. 16 is a bottom plan view of the alternative feeder of FIG. 14 showing the preferred round cob discharge hole.
Figure 17:
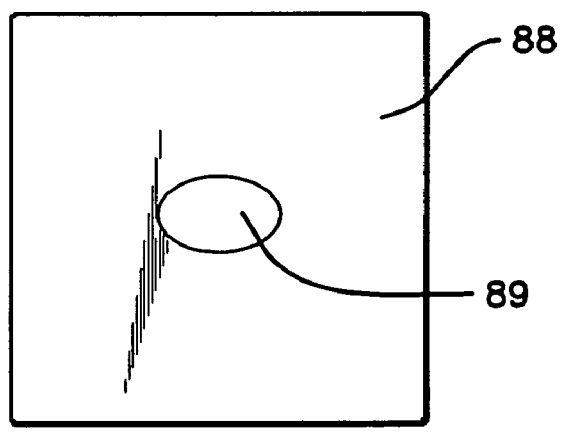
FIG. 17 is a bottom plan view of the alternative feeder of FIG. 15 showing the alternative elliptical cob discharge hole; and, FIG. 18 is a bottom plan view of the alternative feeder with a second alternative elliptical cob discharge orifice that is elongated in both directions from the center of the discharge orifice of FIG. 16.
Figure 18:
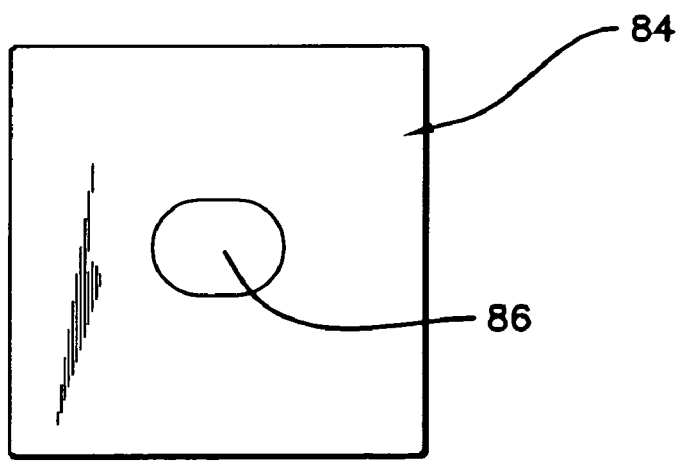

Again, to accommodate the differences in corn ear sizes an shapes, the discharge orifice may be shaped differently. In Figured 14 and 16, for example, the preferred cob discharge orifice 68 is round. As seen in FIGS. 15 and 18, an alternative tray 84 may include an alternative, deformed, out-of-round cob discharge orifice 86, that is elongated and generally shaped like an oval. Both foci of the ellipse formed by orifice 86 (FIG. 18) lie beyond the periphery of circular orifice 68 (FIG. 16). Tray 88 (FIG. 17) has a slightly deformed, elliptical cob discharge orifice 89; one foci of the ellipse shares the center of the former orifice 68 (FIG. 16), but the main extent of the orifice 89 is extended to the right (i.e., as viewed in FIG. 17). The oval shape aids squirrels in dislodging irregularly-shaped ears of corn, that might otherwise get stuck within the hopper. The oval shape eases the alignment requirements, and facilitates a slight rocking motion that drops spent cobs from the hopper.

From the foregoing, it will be seen that this invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A feeder for animals such as squirrels, chipmunks or the like, said feeder comprising:

a tubular hopper having a longitudinal axis and adapted to be disposed in a generally vertical orientation for slidably containing one or more husked ears of corn, the hopper having a bottom;

a feeder tray suspended beneath the hopper for initially contacting ears of corn when they drop through the hopper;

an animal access region defined between said tray and said hopper bottom that exposes corn on said ears to an animal for eating; and, a cob discharge orifice formed in said tray and disposed beneath said hopper bottom and coaxial with said longitudinal axis for automatically discharging empty corn cobs from said feeder.

2. The feeder as defined in claim 1 wherein the hopper has a predetermined diameter equal to or greater than the diameter of said ears of corn, and said cob discharge orifice has a diameter less than said hopper diameter.

3. The feeder as defined in claim 2 wherein the feeding tray is suspended beneath the hopper by a plurality of radially spaced-apart legs.

4. The feeder as defined in claim 2 wherein the diameter of said cob discharge orifice is greater than the diameter of a corn cob.

5. The feeder as defined in claim 4 further comprising a mounting chain secured to said hopper for suspending the feeder from a convenient overhead support.

6. The feeder as defined in claim 4 wherein the tray has a convex bottom that projects downwardly, and an upper supporting concave surface.

7. The feeder as defined in claim 2 wherein the cob discharge orifice is oval to enable corn cobs to rock slightly for clearance.

8. A squirrel feeder comprising:

an elongated, tubular hopper having a longitudinal axis and adapted to be disposed in a generally vertical orientation for slidably containing one or more husked ears of corn, the hopper comprising a round cross section having a predetermined diameter somewhat greater than a husked ear of corn, and the hopper comprising a bottom;

a feeding tray suspended beneath the hopper bottom for initially contacting ears of corn when they drop through the hopper;

an animal access region formed between said tray and said hopper bottom that exposes corn on said ears to a squirrel for eating; and, a cob discharge orifice formed in said tray and disposed beneath said hopper bottom and coaxial with said longitudinal axis for automatically discharging empty corn cobs from said feeder, said discharge orifice substantially coaxially aligned with said hopper, and having a diameter less than said hopper diameter.

9. The feeder as defined in claim 8 wherein the feeding tray is suspended beneath the hopper by a plurality of radially spaced-apart legs.

10. The feeder as defined in claim 8 wherein the cob discharge orifice is round and the size of said cob discharge orifice is greater than the diameter of a corn cob.

11. The feeder as defined in claim 8 wherein the cob discharge orifice is oval to enable corn cobs to rock slightly for clearance.

12. The feeder as defined in claim 8 further comprising a mounting chain secured to said hopper for suspending the feeder from a convenient overhead support.

13. A squirrel feeder comprising:
   an elongated, tubular hopper having a longitudinal axis and adapted to be disposed in a generally vertical orientation for slidably containing one or more husked ears of corn, the hopper comprising a square cross section with dimensions adequate for husked ears of corn to slide therethrough, and the hopper comprising a bottom;
   a feeding tray suspended beneath the hopper bottom for initially contacting ears of corn when they drop through the hopper;
   an animal access region formed between said tray and said hopper bottom that exposes corn on said ears to a squirrel for eating; and,
   a cob discharge orifice formed in said tray and disposed beneath said hopper bottom and coaxial with said longitudinal axis for automatically discharging empty corn cobs from said feeder, said discharge orifice substantially axially aligned with said hopper, and having dimensions less than said hopper dimensions.

14. The feeder as defined in claim 13 wherein the cob discharge orifice has a size greater than the diameter of a corn cob.

15. The feeder as defined in claim 13 wherein the cob discharge orifice is oval to enable corn cobs to rock slightly for clearance.

16. The feeder as defined in claim 15 further comprising a mounting chain secured to said hopper for suspending the feeder from a convenient overhead support.

* * * * *